United States Patent
Reddy et al.

(10) Patent No.: US 8,910,115 B2
(45) Date of Patent: Dec. 9, 2014

(54) SYSTEMS AND METHODS FOR APPLICATION DEVELOPMENT

(75) Inventors: Sathyanarayana V. Reddy, Hyderabad (IN); Srikanth Tamalampudi, Andhra Pradesh (IN); Prajakt Deshpande, Hyderabad (IN); Rajendra Komandur, Hyderabad (IN); Pattabhi Rama Rao Dasari, Hyderabad (IN); Rajkumar Koneru, Windermere, FL (US)

(73) Assignee: Kony Solutions, Inc., Orlando, FL (US)

( * ) Notice: Subject to any disclaimer, the term of this patent is extended or adjusted under 35 U.S.C. 154(b) by 86 days.

(21) Appl. No.: 13/437,640

(22) Filed: Apr. 2, 2012

(65) Prior Publication Data

US 2013/0263083 A1  Oct. 3, 2013

(51) Int. Cl.
G06F 9/44 (2006.01)
G06F 9/45 (2006.01)

(52) U.S. Cl.
USPC .......................... 717/106; 717/107; 717/137

(58) Field of Classification Search
None
See application file for complete search history.

(56) References Cited

U.S. PATENT DOCUMENTS

| | | | | |
|---|---|---|---|---|
| 5,946,489 A * | 8/1999 | Yellin et al. | | 717/147 |
| 6,701,381 B2 * | 3/2004 | Hearne et al. | | 717/106 |
| 6,854,123 B1 * | 2/2005 | Lewallen | | 717/106 |
| 7,127,702 B2 * | 10/2006 | Seki | | 717/107 |
| 7,581,216 B2 | 8/2009 | Kressin et al. | | |
| 7,581,231 B2 * | 8/2009 | Smith et al. | | 719/328 |
| 7,761,844 B2 * | 7/2010 | Bove et al. | | 717/137 |
| 7,937,685 B2 * | 5/2011 | Weil et al. | | 717/107 |
| 7,941,450 B2 | 5/2011 | Hulaj et al. | | |
| 8,060,856 B2 * | 11/2011 | Besbris et al. | | 717/106 |
| 8,332,828 B2 * | 12/2012 | Vargas | | 717/137 |
| 8,464,227 B2 * | 6/2013 | Clinton | | 717/137 |
| 8,533,691 B2 * | 9/2013 | Ben-Artzi et al. | | 717/137 |
| 8,572,591 B2 * | 10/2013 | Cwalina et al. | | 717/147 |
| 8,612,947 B2 * | 12/2013 | LeRoux et al. | | 717/137 |
| 8,621,423 B2 * | 12/2013 | Knight et al. | | 717/106 |
| 8,762,963 B2 * | 6/2014 | Shacham et al. | | 717/137 |
| 2002/0053070 A1 * | 5/2002 | Seki | | 717/107 |
| 2002/0065879 A1 | 5/2002 | Ambrose et al. | | |
| 2002/0130900 A1 | 9/2002 | Davis | | |
| 2004/0143823 A1 * | 7/2004 | Wei | | 717/140 |
| 2004/0158813 A1 * | 8/2004 | Xia et al. | | 717/116 |
| 2004/0225747 A1 | 11/2004 | Kadi | | |
| 2004/0268301 A1 * | 12/2004 | Kaston | | 717/108 |
| 2005/0177837 A1 | 8/2005 | Mensah et al. | | |
| 2006/0101429 A1 * | 5/2006 | Osborne et al. | | 717/137 |
| 2007/0150855 A1 * | 6/2007 | Jeong | | 717/106 |
| 2009/0172652 A1 * | 7/2009 | Simon et al. | | 717/148 |
| 2009/0241135 A1 | 9/2009 | Wong et al. | | |

(Continued)

OTHER PUBLICATIONS

Anthony I. Wasserman, Software engineering issues for mobile application development, [Online] 2010, In Proceedings of the FSE/SDP workshop on Future of software engineering research (FoSER '10) 2010, [Retrieved from the Internet] <http://delivery.acm.org/10.1145/1890000/1882443/p397-wasserman.pdf> 4 pages.*

(Continued)

Primary Examiner — Thuy Dao
Assistant Examiner — Ravi K Sinha
(74) Attorney, Agent, or Firm — Knobbe Martens Olson & Bear LLP

(57) ABSTRACT

Systems and methods are described herein for generating native applications for multiple platforms from a single code base.

24 Claims, 10 Drawing Sheets

(56) References Cited

U.S. PATENT DOCUMENTS

| | | | |
|---|---|---|---|
| 2009/0313004 A1 | 12/2009 | Levi et al. | |
| 2010/0077386 A1* | 3/2010 | Akkiraju et al. | 717/136 |
| 2010/0146492 A1* | 6/2010 | Shacham et al. | 717/137 |
| 2010/0153929 A1* | 6/2010 | Porras et al. | 717/139 |
| 2011/0078678 A1 | 3/2011 | Matthews | |
| 2011/0154305 A1 | 6/2011 | LeRoux et al. | |
| 2011/0209137 A1* | 8/2011 | Berg et al. | 717/171 |
| 2011/0230176 A1 | 9/2011 | Kumar et al. | |
| 2011/0247016 A1* | 10/2011 | Seong | 719/328 |
| 2011/0258595 A1* | 10/2011 | Clevenger | 717/106 |
| 2012/0204160 A1* | 8/2012 | Ben-Artzi et al. | 717/137 |
| 2013/0007698 A1* | 1/2013 | Warila et al. | 717/106 |
| 2013/0031462 A1* | 1/2013 | Calvo et al. | 715/234 |

OTHER PUBLICATIONS

Raento, M., Oulasvirta, A; Petit, R., Toivonen, H., ContextPhone: a prototyping platform for context-aware mobile applications, [Online] 2005, Pervasive Computing, IEEE , vol. 4, No. 2, Jan.-Mar. 2005, [Retrieved from the Internet] <http://ieeexplore.ieee.org/stamp/stamp.jsp?tp=&arnumber=1427649> pp. 51-59.*

Martin, G., Sangiovanni-Vincentelli, A., Platform-based design and software design methodology for embedded systems, [Online] 2001, Design & Test of Computers, IEEE , vol. 18, No. 6, Nov./Dec. 2001, [Retrieved from the Internet] <http://ieeexplore.ieee.org/stamp/stamp.jsp?tp=&arnumber=970421>pp. 23-33.*

Antenna Software, Inc., "Build Once Deploy to Many IDE for Mobile Devices and Smartphones," www.antennasoftware.com/products/mobile-platform/development, published Jan. 29, 2012, retrieved from "Wayback Machine" archive.org on Nov. 6, 2013.

Wikipedia Foundation, Inc., "Mobile application development—Wikipedia, the free encyclopedia," en.wikipedia.org/wiki/Mobile_application_development, published Apr. 4, 2012, retrieved from "Wayback Machine" archive.org on Nov. 6, 2013.

Vision Mobile: "Cross-Platform Developer Tools 2012—Bridging the worlds of mobile apps and the web", Feb. 2012, XP055078850, Retrieved from the Internet: URL:https://svforum.org/sites/default/files/2012_VisionMobile_Cross-Platform_Developer_Tools.pdf [retrieved on Sep. 11, 2013].

* cited by examiner

SYSTEMS AND METHODS FOR APPLICATION DEVELOPMENT

FIELD

Embodiments of the present disclosure relate to application development. More particularly, embodiments of the present disclosure relate to application development for multiple platforms, including mobile platforms, utilizing a single code base.

BACKGROUND

Electronic devices, including mobile devices such as smart phones and tablets, utilize a nearly endless number of permutations of platforms (e.g., operating systems, versions of operating systems, browsers, versions of browsers, etc.), hardware, software (e.g., widgets, applications, etc.), capabilities, etc. Accordingly, to develop applications for such a variety of devices, many different development tools are required. For example, a given development tool may only be suitable for developing an application for a single mobile operating system. Therefore, developers may need to maintain several development tools for building a cross-platform and/or cross-device application as a different tool may be needed to develop the application for each specific platform and/or device

SUMMARY

The systems, methods, and devices described herein each may have several aspects, no single one of which is solely responsible for its desirable attributes. Without limiting the scope of this disclosure as expressed by the claims which follow, its more prominent features will now be discussed briefly. After considering this discussion, and particularly after reading the section entitled "Detailed Description" one will understand how the features of this technology provide advantages that include, without being limited thereto, enabling application development for multiple platforms, including mobile platforms, utilizing a single code base.

In one aspect, the present disclosure provides a method for generating native applications for multiple platforms. The method comprises storing a first source code having a format corresponding to a first programming language. The method further comprises compiling the first source code to generate a first application that includes calls to one or more non-platform-specific programming interfaces associated with the first programming language. The method further comprises determining a first virtualization layer to be used in conjunction with the first application, the virtualization layer being configured to map the one or more non-platform-specific programming interfaces associated with the first programming language to one or more platform specific programming interfaces associated with a second programming language. The method further comprises wrapping the first application with the first virtualization layer to generate a second application associated with the second programming language.

In another aspect, the present disclosure provides an apparatus for generating native applications for multiple platforms. The apparatus comprises a memory configured to store a first source code having a format corresponding to a first programming language. The apparatus further comprises at least one processor coupled to the memory. The processor is configured to compile the first source code to generate a first application that includes calls to one or more non-platform-specific programming interfaces associated with the first programming language. The processor is further configured to determine a first virtualization layer to be used in conjunction with the first application, the virtualization layer being configured to map the one or more non-platform-specific programming interfaces associated with the first programming language to one or more platform specific programming interfaces associated with a second programming language. The processor is further configured to wrap the first application with the first virtualization layer to generate a second application associated with the second programming language.

In another aspect, the present disclosure provides an apparatus for generating native applications for multiple platforms. The apparatus comprises means for storing a first source code having a format corresponding to a first programming language. The apparatus further comprises means for compiling the first source code to generate a first application that includes calls to one or more non-platform-specific programming interfaces associated with the first programming language. The apparatus further comprises means for determining a first virtualization layer to be used in conjunction with the first application, the virtualization layer being configured to map the one or more non-platform-specific programming interfaces associated with the first programming language to one or more platform specific programming interfaces associated with a second programming language. The apparatus further comprises means for wrapping the first application with the first virtualization layer to generate a second application associated with the second programming language.

In another aspect, the present disclosure provides a non-transitory computer-readable medium storing instructions that when executed by at least one computer causes the at least one computer to perform a method. The method comprises storing a first source code having a format corresponding to a first programming language. The method further comprises compiling the first source code to generate a first application that includes calls to one or more non-platform-specific programming interfaces associated with the first programming language. The method further comprises determining a first virtualization layer to be used in conjunction with the first application, the virtualization layer being configured to map the one or more non-platform-specific programming interfaces associated with the first programming language to one or more platform specific programming interfaces associated with a second programming language. The method further comprises wrapping the first application with the first virtualization layer to generate a second application associated with the second programming language.

BRIEF DESCRIPTION OF THE DRAWINGS

Embodiments of the present disclosure are illustrated by way of an example and not limited to the figures of the accompanying drawings, in which like references indicate similar elements and in which.

Figure 1:
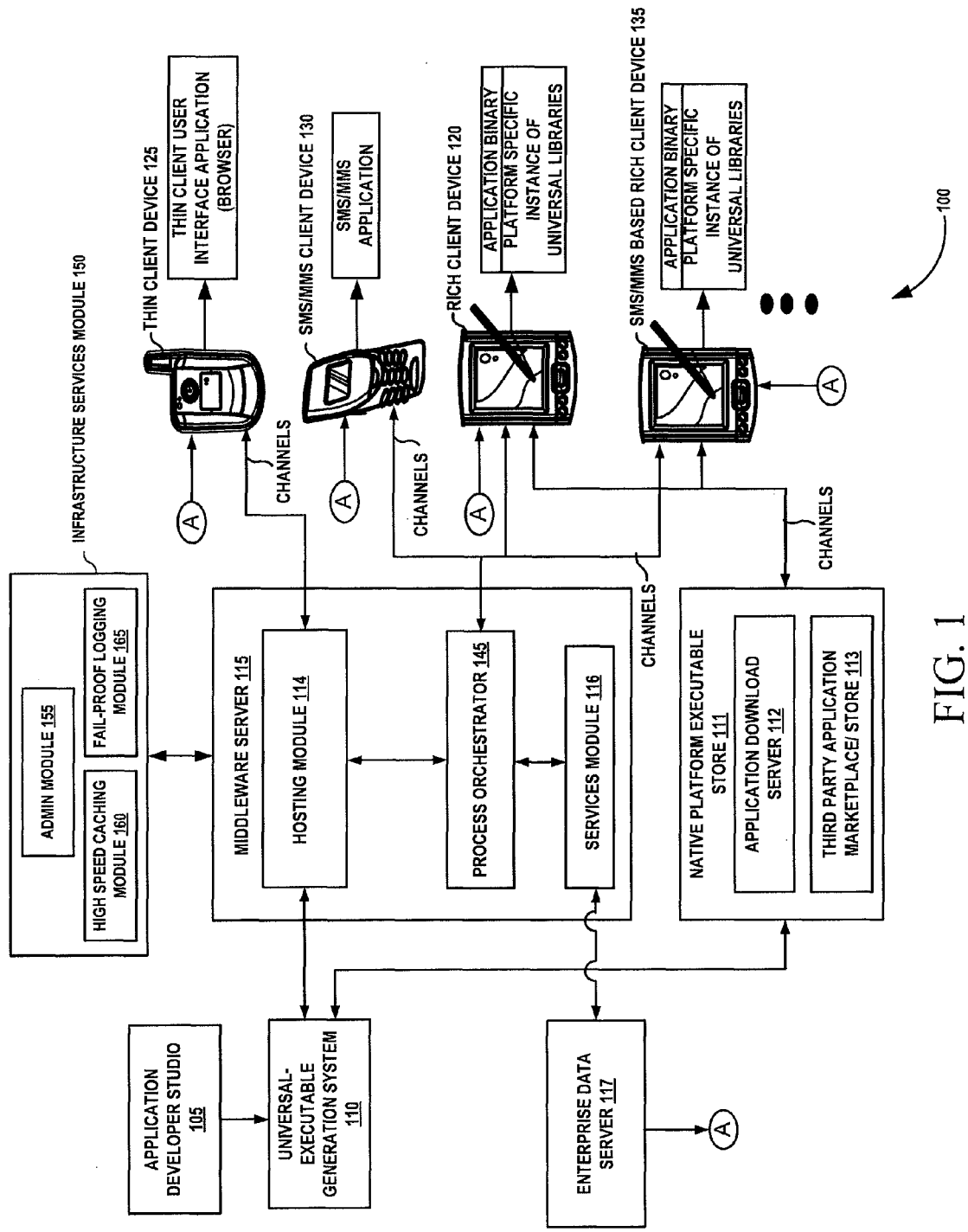
FIG. 1 illustrates a high level block diagram of a mobile computing platform, according to one embodiment.

Other features of the present embodiments will be apparent from the accompanying drawings and from the detailed description that follow.

DETAILED DESCRIPTION

The following detailed description is directed to certain specific embodiments. However, the teachings herein can be applied in a multitude of different ways, including for example, as defined and covered by the claims. It should be apparent that the aspects herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, a system or apparatus may be implemented or a method may be practiced using any number of the aspects set forth herein. In addition, such a system or apparatus may be implemented or such a method may be practiced using other structure, functionality, or structure and functionality in addition to or other than one or more of the aspects set forth herein. In this description, reference is made to the drawings wherein like parts are designated with like numerals throughout.

Systems and methods are described herein for developing applications for multiple platforms (e.g., operating systems, version of operating systems, browsers, versions of browsers, etc.) utilizing a single code base. The systems and methods may be particularly relevant to development of applications for mobile platforms (e.g., web browsers or operating systems running on mobile devices (e.g., personal digital assistants (PDAs), cellular phones, smartphones, tablets, personal computers, etc.).

For example, a developer may wish to develop a travel booking application. Further, the developer may wish to create an application that runs on multiple platforms such as iOS, Windows Phone, BlackBerry OS, Android, webOS, Windows Mobile, Bada, Meego, Symbian, Maemo, and/or Tizen (including the various versions of each). Further, the developer may want to develop the application so that a native machine executable (e.g., .apk, .exe, etc.) is produced for each of the platforms. The native machine executable calls native application program interfaces (APIs) that are native to each device in order to execute instructions. Such native API calls can lead to higher performance levels for the application as the application is optimized for each individual device. The systems and methods described herein may allow such functionality as follows.

In one example, the developer may write source code for the travel booking application in a programming language such as Lua or Javascript. The source code may then be compiled to generate a master application that is not platform specific. In particular, the master application may execute instructions through calls to master programming APIs that are not platform specific. Further, a virtualization layer, such as a platform specific virtual machine, may be created for each specific platform that the master application is to be run. The virtualization layer is configured to map calls to master programming APIs in the master application to calls to native APIs for a particular platform. This is unlike other virtual machines that do not provide such functionality of mapping APIs. Accordingly, the virtualization layer is wrapped with the master application to create a platform specific application (i.e., native machine executable). The native machine executable created works as follows. As the master application is executed, calls to master programming APIs are instead made to the native APIs mapped by the virtualization layer. Accordingly, a travel booking application can be made for specific platforms, while only coding the application in a single code base/language initially (e.g., Lua or Javascript). This is just one non-limiting example of how the systems and methods described herein may be used. Further non-limiting examples and details are provided below.

The systems and methods for developing applications for multiple platforms utilizing a single code base may be referred to herein as a "middleware infrastructure service." The middleware infrastructure service may provide for a non-platform specific application development platform. The middleware infrastructure service may further provide other services include hosting applications, for example for thin client devices, which otherwise, may not be possible due to the limited computing capabilities of thin client devices, or in order to offload processing from any type of mobile device (e.g., thin client device, rich client device, etc.) to a server.

Mobile devices may be broadly classified into two types: a) rich client devices and b) thin client devices. A rich client device typically refers to a mobile device having capabilities to store and execute high end applications. Further, a rich client device is often characterized by the ability to perform multiple functions (e.g., smartphones, iPhone, Windows Phone, Android phones, etc.). In contrast, a thin client device refers to a mobile device which depends primarily on a server for processing activities, and mainly focuses on conveying input and output between a user and the remote server (e.g., such as through messaging services including short message service (SMS), wireless application protocol (WAP), web browsers, etc.). Many thin client devices run only web browsers, meaning that all significant processing occurs on the server. Typically, the mobile devices contain a wide variety of operating systems, application interfaces, user-input interfaces, data display types and sizes, memory sizes, protocol types, and so on.

The mobile devices interfaced in a wireless communication environment, are generally, characterized by existence of multiple commercial networks, such as Mobitex, Cellular Digital Packet Data (CDPD), Global System for Mobile communication (GSM), Radio Frequency (RF), or Wireless LAN (Local Area Network) networks, and numerous other protocols. Systems may operate in an end-to-end fashion, e.g., services are linked from a provider to client devices and are usually independent of other providers.

Also, mobile devices may have very small foot prints, e.g., limited memory, processing capacities, and display size. Therefore, they may be limited in the size of applications that they can process. For example, some cellular phones have four lines of display whereas some have six lines of display. Also, many rich client devices cannot support multiple applications. Thus, the variety in device architectures, functions, and data transfer methods coupled with the limited application storage capacity have created an ever-increasing number of device specific applications across many different mobile-device types. Further, the proliferation of mobile devices, has created a need for a specialized computing platforms to produce device specific applications to operate and extend the usefulness of the mobile devices. Accordingly, the systems and methods described herein for developing applications for multiple platforms utilizing a single code base may be very useful.

In the document:

"SMS/MMS client application" at least refers to a SMS/MMS application, based on SMS/MMS protocol, for example on a mobile device, using a server for accessing and processing the functionalities of an enterprise or consumer application residing on a server;

"thin client application" at least refers to a user interface application such as browser application(s) based on WAP 1.0, WAP 2.0, CHTML, XHTML, etc. protocols for communication by a mobile device. The thin client application uses a server for processing functions of an enterprise or consumer application residing on the server;

"rich client application" at least refers to an enterprise or consumer application resident on a mobile device with an execution platform and which is capable of executing the application and may depend on the server for exchange of data;

"rich client device" at least refers to a mobile device having capabilities to execute one or more "rich client applications" and may also have capabilities to execute at least one of "thin client application" and "SMS/MMS client application";

"thin client device" at least refers to a mobile device having capabilities to execute the one or more "thin client applications" and the "SMS/MMS client application";

"SMS/MMS client device" at least refers to a mobile device having capabilities to execute "SMS/MMS client application" and can communicate only on SMS/MMS protocol for communicating with external sources;

"SMS/MMS based rich client" at least refers to a rich client application using SMS/MMS as available communication channel; and The terms "mobile device" and "client device" are interchangeably used throughout the document.

FIG. 1 illustrates an example of a high level block diagram of a mobile computing platform 100. The mobile computing platform 100 includes an application developer studio 105, a universal-executable generation system 110, a native platform executable store 111, a middleware server 115, an infrastructure services module 150, and client devices including a rich client device 120, a thin client device 125, an SMS/MMS client device 130, and an SMS/MMS based rich client device 135. As shown in FIG. 1, the middleware server 115 includes a hosting module 114, a services module 116, and a process orchestrator 145. Further, the mobile computing platform 100 may optionally include an enterprise data server 117 which may include data sources including but not limited to enterprise information services (EIS), a database (e.g., Oracle, Microsoft Access, etc.), web services (SOAP, REST, XML/HTTP), a scraper, composite service (not shown in figure), etc.

According to an embodiment, the application developer studio 105 may provide functionalities and various tools for developing applications for multiple platforms utilizing a single code base. The application developer studio 105 may include tools, such as a form tool for developing different types and kinds of forms, a service definition tool for mapping and configuring external business services created by enterprises (e.g., client side logic) in the forms, a code assistant for developing business logic, a process flow logic tool for defining process flow logic in the forms or applications on server side (e.g., composite services) and/or the like, for producing graphical user interface (GUI) artifacts, GUI widgets, etc.

In one embodiment, the application developer studio 105 enables a developer to develop an application in a first programming language (e.g., Lua, Javascript, etc.) by first creating a first source code in the first programming language. The universal-executable generation system 110 may receive the first source code from the application developer studio 105 and compile the first source code to generate a master application that is not platform specific. The master application may comprise an application binary. The first source code may comprise code that represents user interface (UI) layout and application logic for the application being developed. For example, the universal-executable generation system 110 may convert the first source code (e.g., in Lua source code) into an intermediate application binary representation (e.g., Lua byte code).

The universal-executable generation system 110 may then wrap/combine the master application with a platform specific virtualization layer (e.g., virtual machine) to form a platform specific application (e.g., native platform executable, native machine executable, processor specific binaries (ARM, X8, etc.)). The universal-executable generation system 110 may combine the master application with a different platform specific virtualization layer for each platform that a platform specific application is to be developed. For example, a first platform specific virtualization layer may be combined with the master application to create an iOS specific application, and a second specific virtualization layer may be combined with the master application to create an Android specific application. As discussed above, the virtualization layer is configured to map calls to non-platform specific universal libraries (e.g., master programming APIs, non-platforms specific programming interfaces, non-platforms specific APIs, etc.) of the master application to calls to platform-specific universal libraries (e.g., platform specific programming interfaces, platform-specific APIs, native APIs, etc.) for a particular platform. In some aspects, a single master programming API may map to a single native API. In some aspects, multiple master programming APIs may map to a single native API. In some aspects, a single master programming API may map to multiple native APIs.

In some embodiments, the universal-executable generation system 110, independent of generating the platform specific application, is also able to generate platform specific source code from the first source code used for developing the application in the application developer studio 105. For example, the universal-executable generation system 110 converts the first source code (e.g., Lua source) into a second source code (e.g., Java, Objective-C). The second source code can also be compiled along with the platform specific instance of universal libraries to generate platform specific application, which is independent of the wrapping/combining the master application with a platform specific virtualization layer (e.g., virtual machine) to form a platform specific application (e.g., native platform executable, native machine executable, processor specific binaries (ARM, X8, etc.)) described above.

The platform specific instance of universal libraries may include native language code and an associated standard application programming interface (API) library. Each platform specific application for different type of platforms, generated by the universal-executable generation system 110, may be stored in an application download server 112 and/or a third party application marketplace/store 113 of the native platform executable store 111. In one implementation, the universal-executable generation system 110 is remotely connected to the native platform executable store 111 such that the universal-executable generation system 110 publishes native platform executable in the application download server 112 and/or the third party application marketplace/store 113. Each of the application download server 112 and the third party application marketplace/store 113 may be remotely connected to the rich client device 120 and the SMS/MMS based rich client device 135 through one or more communication channels as illustrated in FIG. 1.

The application download server 112 and the third party application marketplace/store 113 may allow the rich client device 120 and the SMS/MMS based rich client device 135 to install the respective platform specific application generated by the universal-executable generation system 110 from a single code base. Once the platform specific application is installed on the rich client device 120, a user of the rich client device 120 can access the platform specific application by executing the application binary, where the application binary associated with the platform specific application is executed using the platform specific instance of universal libraries in the rich client device 120.

In some embodiments, a platform specific application generated by the universal-executable generation system 110 from a single code base is designed for a thin client device. Accordingly, the platform specific application may map universal library calls of the master application to hypertext markup language, Flash, widget, Javascript, cascading style sheets, or the like that can be displayed on a browser of the thin client device. The platform specific application may be installed in the middleware server 115 such that the hosting module 114 hosts the platform specific application along with a server side runtime framework (not shown) for providing access to application functionalities using thin client applications on the client devices. Accordingly, the middleware server 115 may communicate data with the thin client applications on the client devices and process the data at the middleware server 115.

In some embodiments, the platform specific applications generated by the universal-executable generation system 110 from a single code base may be easily updated as follows. A developer may modify the first source code used to generate the master application, such as by changing the application logic represented by the source code using the application developer studio 105. Accordingly, the universal-executable generation system 110 may compile the updated first source code to generate an updated master application. The universal-executable generation system 110 may then communicate the updated master application to the middleware server 115, application download server 112, and/or third party application marketplace/store 113 without any updates to the virtualization layer. A client device may download the updated master application without an updated virtualization layer from the middleware server 115, application download server 112, and/or third party application marketplace/store 113. The client device and/or middleware server 115 may replace the original master application with the updated master application in the platform specific application without replacing the virtualization layer. Accordingly, even multiple platform specific applications for different platforms may be updated by only compiling and transferring an updated master application.

The middleware server 115 may be communicatively coupled to all the client devices through various channels. As illustrated, the rich client devices 120 and the SMS/MMS rich client devices 135 are communicatively coupled to the services module 116, the thin client devices 125 are communicatively coupled to the hosting module 114 and the SMS/MMS client devices 130 are communicatively coupled to the process orchestrator 145. Moreover, the rich client devices 120, the thin client devices 125, the SMS/MMS client device 130 and the SMS/MMS rich client devices 135 directly interact with the enterprise data server 117 or interact via the middleware server 115.

The rich client device 120 and SMS/MMS rich client device 135 may include an operating system (OS) such as iPhone OS, Android, Palm WebOS, Symbian, Blackberry, Linux, Windows Mobile, and the like, and an associated OS specific application development stack such as Cocoa, Java, Mojo, S60, Java, Qtopia, .Net, etc. Further, the rich client device 120 and SMS/MMS rich client device 135 as shown in FIG. 1 may contain application binaries associated with various platform specific applications, a runtime environment and associated platform specific instance of universal libraries. In one embodiment, each application binary is generated by the universal-executable generation system 110 and then is combined with respective platform specific instance of universal libraries to form a native platform executable/platform specific application as discussed above. The native platform executable may be stored in the application download server 112/the third party application marketplace/store 113.

The native platform executable associated with each platform specific applications is thus available for download and install for each of specific type of the rich client devices 120 and the SMS/MMS based rich client devices 135 through any of communication channels, explained in greater detail in the below description. Typical communication channels associated with the rich client device 120 may include at least one of WiFi, GPRS, Edge, 3G, WLAN, SMS/MMS, WAP, i-mode, etc. protocols.

The thin client device 125 may include a browser, an operating system (OS) such as Windows mobile, Linux, etc. and an SMS/MMS client application. The browser can display web pages written in HTML, XHTML-MP, WML, WAP, etc. formats. Typical communication channels associated with the thin client device 125 may include at least one of WiFi, GPRS, Edge, 3G, SMS/MMS, WAP, i-mode, etc. protocols. Further, the thin client device 125 may have limited processing capabilities and may rely on accessing the hosting module 114 each time input data needs to be processed or validated. The SMS/MMS client device 130 is a low-end thin client device, wherein the channel for communication is only using SMS/MMS protocol which may access the middleware server 115 each time input data needs to be processed or validated via an SMS/MMS request.

The services module 116 of the middleware server 115 may provide support services such as image management, data chunking, external data access, device detection, etc. to the client devices via the process orchestrator 145. Further, the services module 116 can extend the functionalities of one or more platform specific applications such that appropriate size and format of the data requested, is delivered to the client devices based on the specific device capabilities such as memory size, display size, form factor, etc via the process orchestrator. For example, the thin client device 125 may request business services associated with the one or more platform specific applications hosted by the hosting module 114 via one of the SMS/MMS, WAP, i-mode, etc. communication channels.

The process orchestrator 145 may also process the SMS/MMS request associated with the application functionality, received from a SMS/MMS client application based on communication channel and device specific capability. The enterprise data server 117 may provide external data fetched from external data sources to the one or more client devices requesting the external data. Also, the services module 116 may interact with the enterprise data server 117 to fetch the external data and provide the external data to the one or more client devices, which requested the services module 116 for the external data, in an appropriate format.

In some embodiments, although the rich client device 120 can execute and process one or more rich client applications, it may also use resident thin client applications and SMS/MMS client application to access platform specific applications hosted on the middleware server 115.

In some embodiments, the infrastructure services module 150 includes an admin module 155, a high speed caching module 160 and a fail-proof logging module 165. The admin module 155 stores data associated with a state of the deployed platform specific applications, and configuration of platform specific applications. Further, the admin module 155 monitors the performance of the middleware server 115 and periodically collects diagnostics and metrics data associated with the middleware server 115 during run-time and generates a report. The high speed caching module 160 helps improve performance of platform specific applications while reducing the load on a backend database server. The fail-proof logging module 199 logs events (e.g., transactional, system exceptions, etc.) occurring in the platform 100 during real time and helps the admin module 155 to generate reports, perform diagnosis, etc. The middleware server 115 is explained in greater detail in description of FIG. 2 below.

Figure 2:
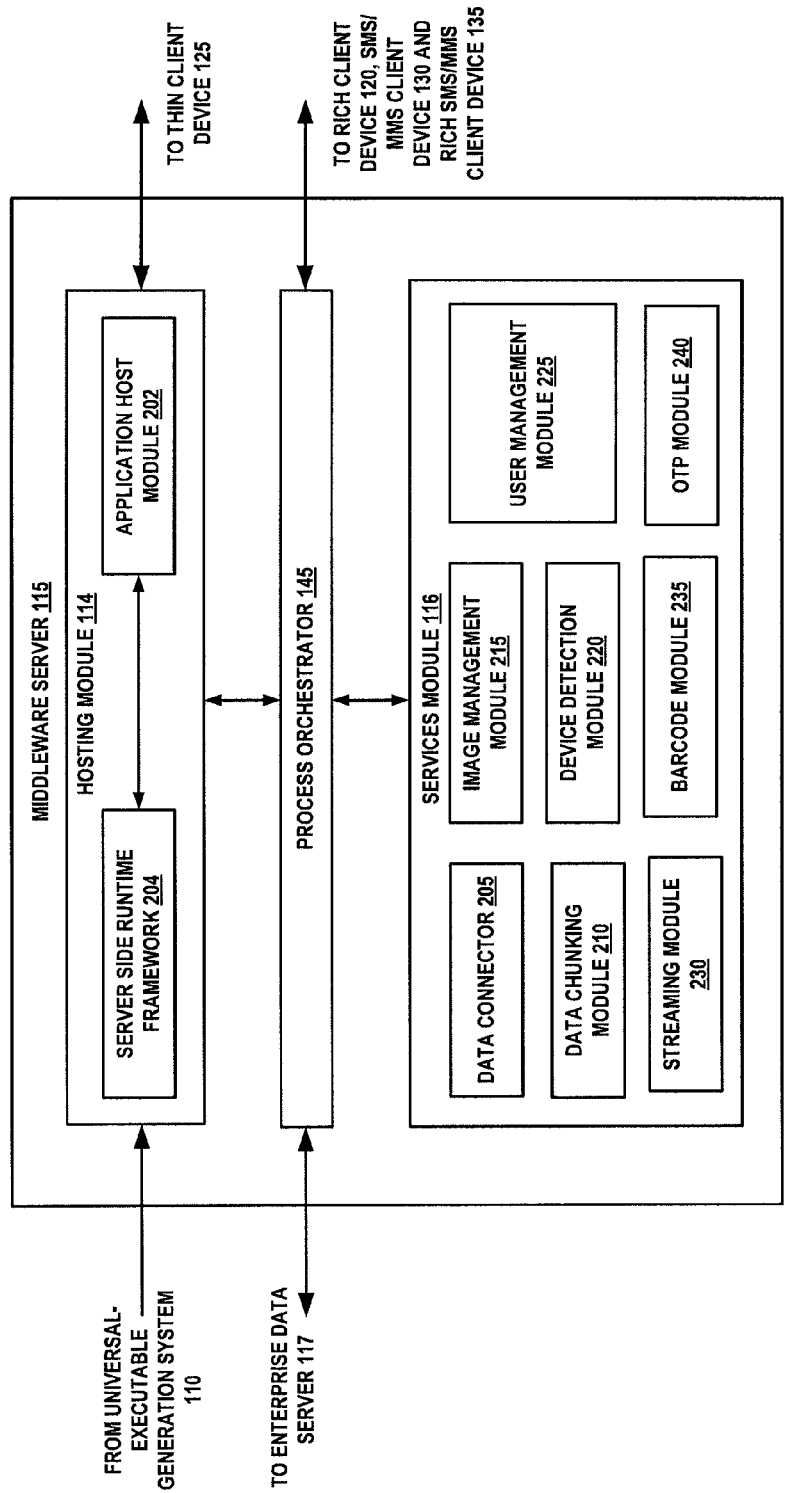
FIG. 2 illustrates a high level block diagram of the middleware server of FIG. 1.

FIG. 2 illustrates a high level block diagram of the middleware server 115 of FIG. 1 which provides middleware infrastructure services to the various client applications on the client devices. Particularly, FIG. 2 illustrates the middleware server 115 including the hosting module 114, the process orchestrator 145 and the services module 116. The hosting module 114 includes an application host module 202 and a server side runtime framework 204 and the services module 116 includes data connectors 205, a data chinking module 210, an image management module 215, a device detection module 220, an user management module 225, a streaming module 230, a barcode module 235 and a one time password (OTP) module 240.

With reference to FIG. 1, the platform specific application generated by the universal-executable generation system 110 from a single code base is installed in the middleware server 115 such that the hosting module 114 hosts the platform specific application along with the server side runtime framework 204 for providing access to a thin client application on the client devices.

In one implementation, the application host module 202 hosts the platform specific application generated by the universal-executable generation system 110 from a single code base for the thin client application on the client devices such that users of the client devices can access the platform specific application hosted by the application host module 202 using the browser in the client devices.

In this implementation, the process orchestrator 145 interacts with the application host module 202 and the server side runtime framework 204 for providing access to functionalities of the hosted platform specific application using the thin client application. As shown in FIG. 1, the server side runtime framework 204 enables event handling to run the hosted platform specific application generated from the single code base without modification to the single code base. For example, the server side runtime framework 204 executes client side logic using server side proxy objects. Thus, the server side runtime framework 204 enables the client devices using the thin client application to access application functionalities of the platform specific application (otherwise not possible due to their limited abilities). The details of the hosting module 114 are explained in greater detail in FIGS. 3A and 3B.

In another implementation, the process orchestrator 145 (controller module) communicates with the services module for providing various business services in response to requests received from the rich client devices 120, thin client devices 125 and the rich SMS/MMS client devices 135. The services module 116 provides various business services, such as an image management, data chunking, device detection, external data access, and user management, to the rich client devices, the thin client devices, and the rich SMS/MMS client devices.

In some implementations, the process orchestrator 145 accepts one or more requests, processes the one or more requests and provides the various business services to the client devices. Based on a type of request, a type of data connector 205 is selected and external data is accessed from the enterprise data server 117. The data connectors 205 may include a web service connector, a scraping connector, a database connector, an enterprise information system (EIS) connector and the like for accessing web services, web sites, a database, and an EIS included in the enterprise data server 117, respectively to fetch the external data. In addition, the data connectors convert the fetched external data which are in different formats into a uniform data format (like JSON, XML, tokenized string). Further, the device detection module 220 detects a type of the client device which requested the external data from the external data server 117.

The data chunking module 210 then chunks the fetched external data based on capability of the client device. The data chunking module 210 can chunk the data to a fixed size and not based on the capability of the client device. For example, the thin client application may be capable of receiving only 30 kb of data as opposed to receiving the entire 100 kb of the fetched external data. In this scenario, the data chunking module 210 chunks the fetched external data such that approximately 30 kb of data is received by the thin client application on the client device. The remaining portion of the fetched external data, i.e., 70 kb, is sent to the thin client application based on the further requests from the client device. The operation of the data chunking module 210 is explained in greater detail in FIG. 7 through FIG. 9.

The image management module 215 formats/sizes/adjusts color resolution of image data in the fetched external data based on capability of the requesting client device. In one embodiment, the process orchestrator 145 interacts with the image management module 215 for formatting the image data based on the capability of the client device. The image management module 215 may select appropriate image data from the image datastore (file system, RDBMS) having pre-generated images. The operation of the image management module 215 is explained in greater detail in description of FIG. 4 through FIG. 6

The user management module 225 manages information associated with the request received from a user of a client device, based on the user preferences, transactional data from enterprise data server 117, session information, and security information. In one embodiment, the user management module 225 enables storing of data (both processed and fetched using the enterprise data server 117) associated with the service request by the user of the client device.

The streaming module 230 enables server push capability. The client devices may make a connection to the streaming module 230 for application specific data. The streaming module 230 may fetch external/internal data and pass application specific data to client device. It can be noted that, in this case, the network connection is not terminated between client and server after serving the client device for the first time. In case the network connection is terminated, the middleware server 115 and client device may re-establish the connection without user intervention. Thereafter, only modified application data is passed to the client devices rather than entire application data.

For example, in stock quote streaming, the client device may make a network connection to the streaming module 230. The streaming module 230 passes stock info to the client device. The network connection is not terminated between the client device and the middleware server 115 after serving the request for the first time. Based on stock updates, like price and volume change, modified stock info is passed to client device from the streaming module 230.

The barcode module 235 enables the middleware server 115 to generate/read 1D or 2D barcode images on-the-fly on the middleware server 115, e.g., without storing barcode images on the middleware server 115. In this case, the client device passes information to the middleware server 115 for barcode generation. The barcode module 235 generates barcode image based on complete/partial information provided by the client device. The generated barcode image is streamed/sent to the client device via the streaming module 230. In one embodiment, the barcode image can be optimized using the image management module 215. The client device may thus render the barcode image sent by the middleware server 115.

For example, in a retail application, a user of the client device is provided with discount coupons. The client device may send a request to the middleware server 115 for redeeming discount coupons. The middleware server 115 may fetch external data using the data connectors 205 and may pass relevant information to the barcode module 235 for generating the barcode images. The barcode module 235 may generate 1D or 2D barcode images and may send the barcode images to the client device for rendering. In another example, in an airline application, the client device may send a string/info for barcode generation to the barcode module 235. The barcode module 235 may generate a barcode image based on the string/info and send the barcode image to the client device for rendering.

The OTP module 240 provides capability for generating one-time passwords valid for a particular period of time. On input provided to the OTP module 240, standard MD5 or SHA based algorithms are performed and a message digest is generated. The message digest is encoded to produce encoded input. The hash algorithm is applied to the encoded input to produce an OTP which is called a middleware server OTP. The input can be a combination of static and dynamic input. Static input is not changed with time unless a user makes/requests a change. Dynamic input changes with time without user intervention. The middleware server OTP is compared with client OTP to perform multi factor authentication (MFA).

For example, in a banking application, a user is provided with a MFA. A first factor may be a login with userid/password. A second factor may be a one time password (OTP). The OTP module may generate an OTP based on inputs like user pin, security code and server time or input/code which is valid for a particular time period. In this case, user pin and security are static inputs and never change with time unless a user places a request with the bank. Server time or input/code are dynamic inputs which change with time and are taken from the OTP module 240 by the client device automatically or due to user intervention. The OTP generated on the client device is passed to the middleware server 115. In the middleware server 115, the OTP module 240 generates middleware server OTP based on a user pin, security code and/or server time or input/code which is valid for a particular time period. If the middleware server OTP and client device OTP are the same, then the client device passes the second factor authentication.

With reference to FIGS. 1 and 2 and as discussed above, the above-described mobile computing platform 100 may be applicable for use in a travel booking application scenario. In this example, a developer may develop a travel booking application using the application developer studio 105. Further, the universal executable generation system 110 may generate an application binary using source code of the travel booking application. The universal-executable generation system 110 may then create a native platform executable by combining the application binary with platform specific instance of universal libraries associated with each kind of the rich client devices. It can be noted that, each native platform executable is associated with a specific kind of platform and is meant to be installed on a rich client device with that specific kind of platform.

For example, if the travel booking application is meant for an iPHONE, then the universal-executable generation system 110 may use Objective C and Cocoa, where Objective C is a native language code and Cocoa is a standard API library for iPHONE, to form the native platform executable for iPHONE. Similarly, if the travel booking application is meant for the rich client devices having Windows Mobile platform, then the universal-executable generation system 110 may use C-sharp and .Net, where C-sharp is a native language code and .net is a standard API library, to form the native platform executable for Windows Mobile OS. Each native platform executable for each kind of platform is then stored in the application download server 112 or the third party application marketplace/store 113.

If a user wishes to download the travel booking application to access a travel booking service using the travel booking application on his/her mobile device (e.g., the rich client device 120), then, in one embodiment, the user may make a request through a browser of the rich client device 120 for the travel booking application. Upon receiving the request, the application download server 112 and/or the third party application marketplace/store 113 may enable the rich client device 120 to download and install the travel booking application suited for its platform using the respective native platform executable. Thus, the user of the rich client device 120 can access the travel booking service using the travel booking application installed on the rich client device 120.

In another embodiment, the application binary generated by the universal-executable generation system 110 is installed on the middleware server 115 such that the hosting module 114 hosts the travel booking application and the server side runtime framework 204 associated with the travel booking application for the thin client device 125 and SMS/MMS client device 130. In other words, the middleware server 115 facilitates a user of the thin client device 125 and the SMS/MMS client device 130 to access the travel booking application on the thin client device 125 and the SMS/MMS client device 130 using the server specific instance of universal libraries in the server side runtime framework 204.

For example, the middleware server 115 provides the travel booking service via a browser of the thin client device 125 and/or via a SMS/MMS to the SMS/MMS client device 130. In one implementation, the middleware server 115 provides rich functionalities of the travel booking application to client devices, accessing the travel booking application via the thin client application or SMS/MMS client application as described below. For example, a user of a client device may request the middleware server 115, hosting the travel booking application, for a service via a browser and/or SMS/MMS application of the client device. In such a case, the middleware server 115 determines a type of the browser or SMS/MMS application used by the client device for requesting a service.

In one example embodiment, the process orchestrator 145 forwards the request for service from the client device to the hosting module 114 hosting the travel booking application. Then, the hosting module 114 determines the kind of the service requested by the user. Based on the determination, the process orchestrator 145 determines whether the type of service requested requires any external data to be fetched from the enterprise data server 117. The external data may include a logo of travel booking website, details of flights such as prices and/or timings.

If the external data needs to be fetched and provided to the client device, the process orchestrator 145 uses a specific type of data connectors to fetch the external data from the enterprise data server 117. For example, the data connectors can convert the extracted external data which are in different formats into a uniform data format. The data in uniform data format thus fetched is formatted as per the requirement of the client application requesting the service.

In one embodiment, the process orchestrator 145 may use the image management module 215 to format/re-size/adjust color resolution of the image data associated with the travel booking website so that the formatted data can be presented to the client device as per its display capability. In another embodiment, if the service is requested via a SMS/MMS client application, then the process orchestrator 145 may use the data chunking module 210 to chunk the fetched data and format the chunked data so that the data can be presented in an SMS/MMS format to the requesting client device. Finally, the process orchestrator 145 provides the services requested by the client device in such a way that data provided is as per the client device capabilities and the user can easily access/view the data.

Figure 3A:
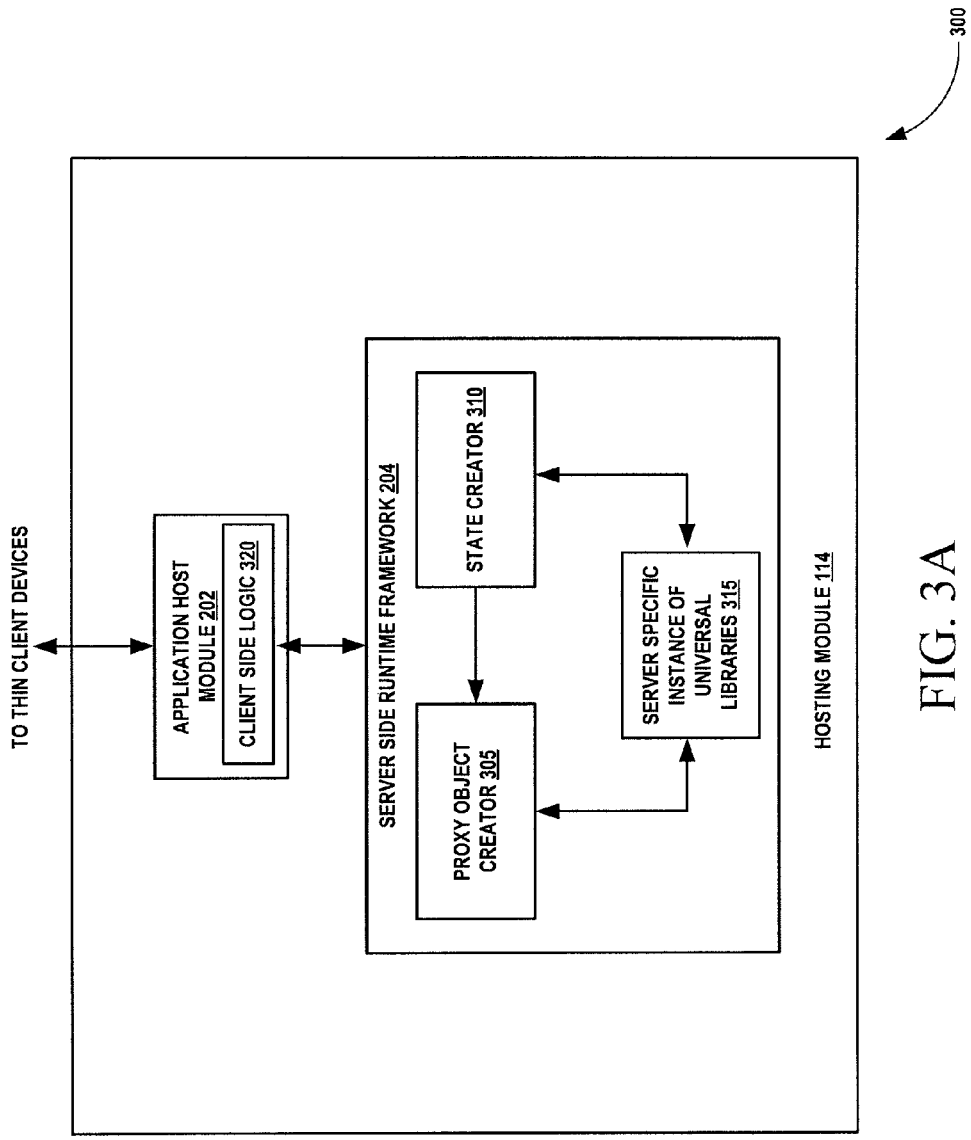
FIG. 3A is an exploded view of the hosting module of FIG. 2.
Figure 4:
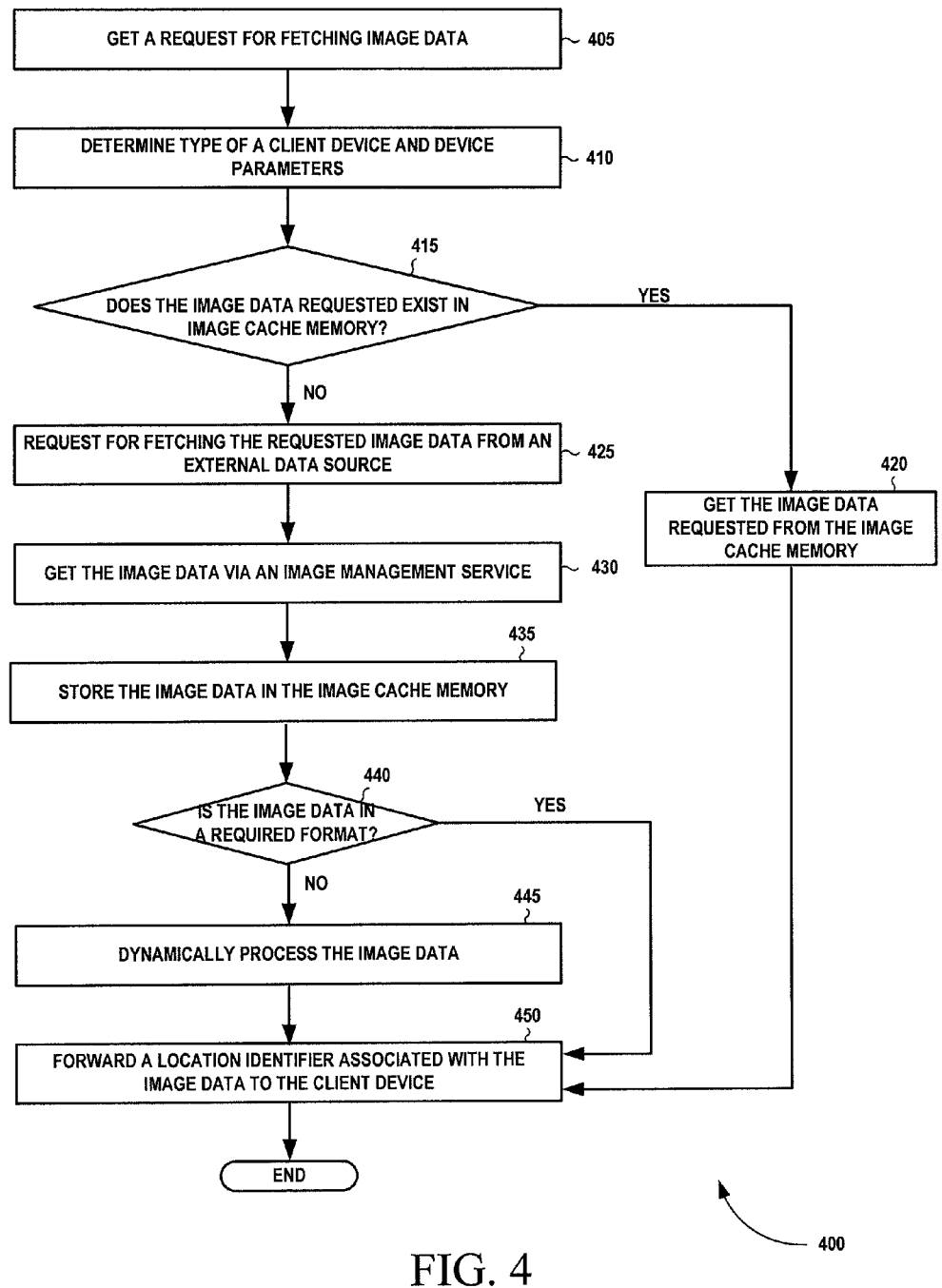
FIG. 4 illustrates a process flowchart of a method of mapping images based on device specific capabilities in the mobile computing platform of FIG. 1.

FIG. 3A is an exploded view 300 of the hosting module 114 of FIG. 2 including the server side runtime framework 204 for executing applications on the server side for a thin client application. In FIG. 3A, the hosting module 114 includes the application host module 202 including client side logic 320. Further, the hosting module 114 includes the server side runtime framework 204 coupled to the application host module 202 for executing the client side logic 320 in the application host module 202 for thin client applications. The client side logic 320 includes validation logic, navigating logic, dynamic display logic, business logic, and/or the like. As shown in FIG. 4, the server side runtime framework 204 includes a proxy object creator 305, a state creator 310 and a server specific instance of universal libraries 315. The hosting module 114 is communicatively coupled to client devices associated with the thin client application and the application host module 202.

In operation, the application host module 202 receives a request from the thin client device. The application host module 202 then forwards the request to the server side runtime framework 204 upon validating the received request. In the server side runtime framework 204, the proxy object creator 305 creates server side proxy objects for the valid request using the server specific instance of universal libraries 315. The state creator 310 parses states associated with the browser request. Also, the state creator 310 feeds the parsed data into the server side proxy objects. The proxy object creator 305 loads the server side proxy objects and the client side logic 320 from the application host module 202 in the server side runtime framework 204 such that the application host module 202 executes the client side logic 320 and sends an optimized mark-up language to the thin client device. For example, if the thin client device having XHTML browser, then optimized mark-up may enable the device to display the data (image and text) in a format (large font, small font, medium font) as per device capability of thin client device.

Figure 3B:
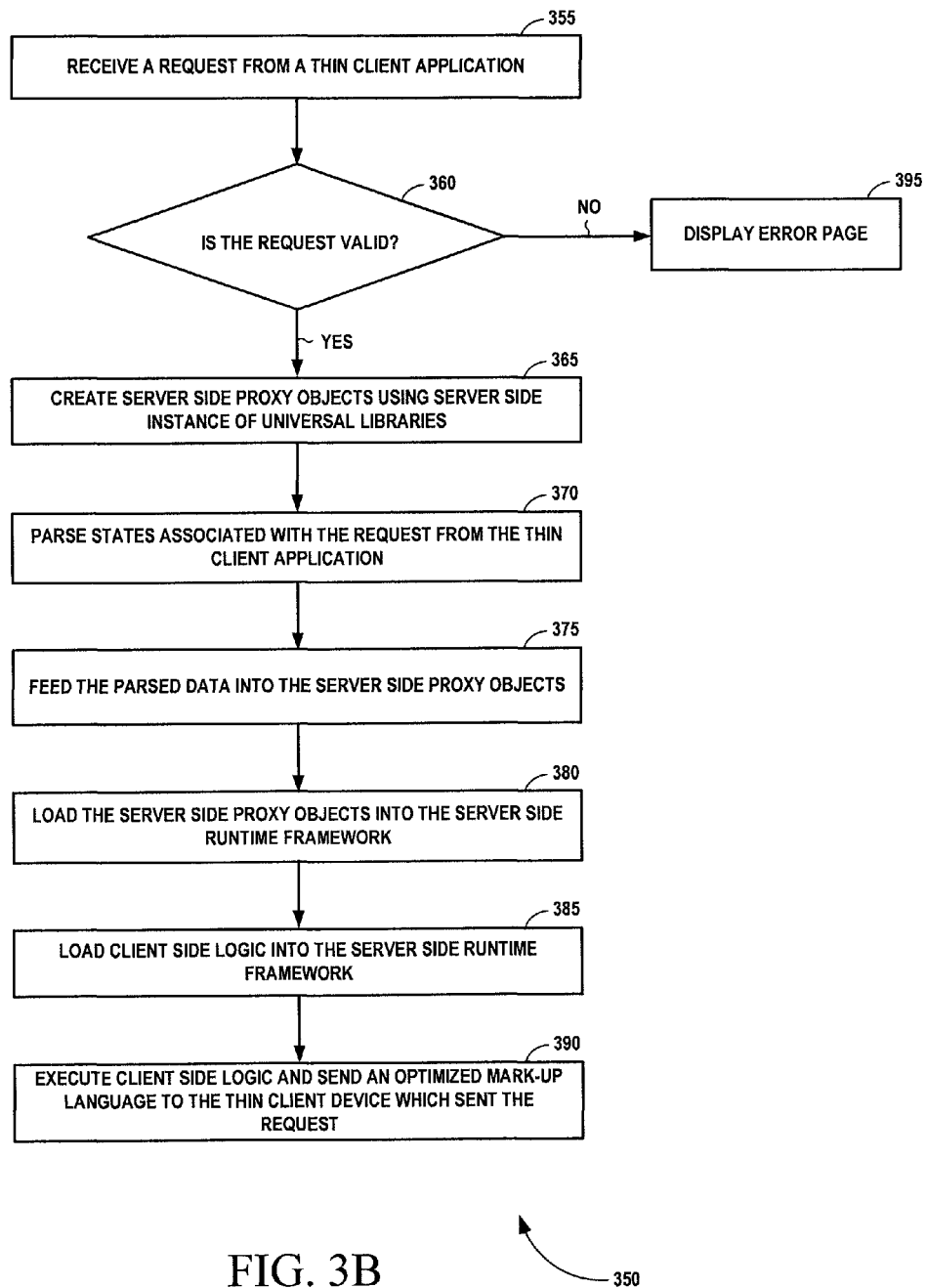
FIG. 3B illustrates a process flowchart of a method of executing client logic using the hosting module of FIGS. 1 and 4.

FIG. 3B illustrates a process flowchart 350 of an method of executing client logic 320 using the hosting module 114 of FIGS. 1 and 4, for each valid request received from the thin client application. In step 355, a request is received from a thin client application for execution of the client side logic 320. For example, the thin client application may be associated with a rich client device (e.g., the rich client device 120 of FIG. 1), and a thin client device (e.g., the thin client device 125 of FIG. 1). In step 360, it is determined whether the request received from the thin client application is a valid request.

If it is determined that the request received from the thin client device is valid, then the process 350 goes to step 365, else the process 350 is routed back to step 355. In step 365, server side proxy objects are created using the server specific instance of universal libraries 315. In step 370, states associated with the request are parsed. In step 375, parsed data is fed into the server side proxy objects. In step 380, the server side proxy objects are loaded into the server side runtime framework 204. In step 385, the client side logic 320 in the application host module 202 is loaded into the server side runtime framework 204. In step 390, the client side logic 320 is executed and an optimized mark-up is sent to the thin client device.

FIG. 4 illustrates a process flowchart 400 of a method of mapping images based on device specific capabilities in the mobile computing platform 100 of FIG. 1. In step 405, a request for fetching image data required by a client application (e.g., rich client application, thin client application) is obtained from an appropriate service module. In step 410, a type of a client device and device parameters are determined. For example, the device parameters include memory size, compatibility, etc. In step 415, it is determined whether the image data requested exists in image cache memory. If so, the process 400 goes to step 420, otherwise the process 400 goes to step 425. In step 420, the image data requested is obtained from the image cache memory. The process 400 then goes to step 450.

In step 425, the image data is requested for reception from an external data source (e.g., the external data sources in the enterprise data server 117 of FIG. 1). In step 430, the image data is fetched from the external data source via an image management service. In step 435, the image data is stored in the image cache memory. In step 440, it is determined whether the image data is in a required format. If the image data is not in the required format, the process 400 goes to step 445, else the process 400 goes to step 450. In step 445, the image data is dynamically processed based on the device capabilities (capabilities of a thin client device and a rich client device). For example, processing includes formatting, resizing, resolution adjustment, bit depth correction, etc. In step 450, a location identifier associated with the processed image data is forwarded to the respective client device (e.g., the thin client device or the rich client device). The process 400 is then ended.

Figure 5:
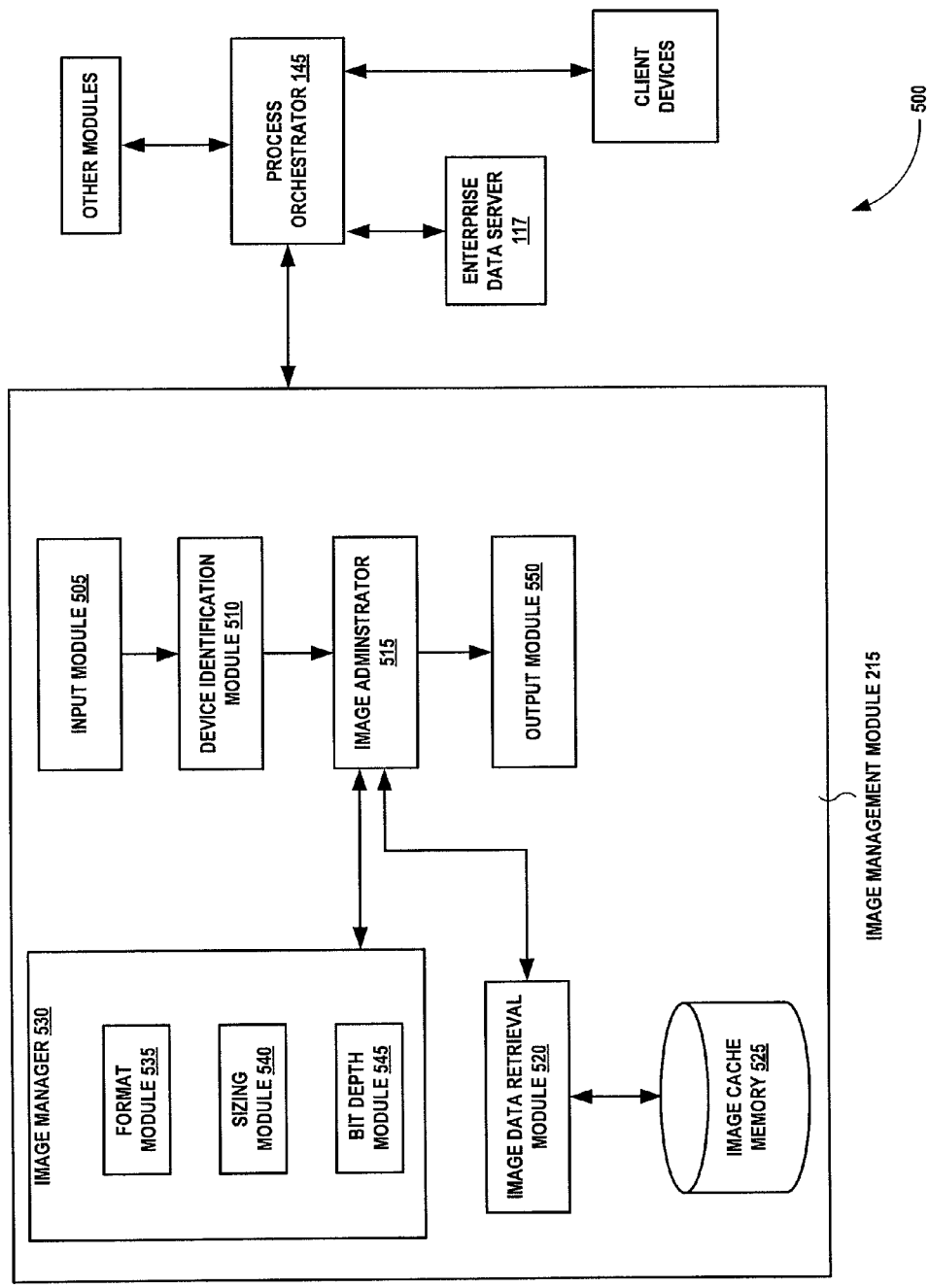
FIG. 5 illustrates a block diagram of the image management module of FIG. 2.

FIG. 5 illustrates a block diagram 500 of the image management module 215 of FIG. 2. Particularly, FIG. 5 illustrates the image management module 215 including an input module 505, a device identification module 510, an image administrator 515, an image retrieval module 520, image cache memory 525, an image manager 530 and an output module 550. Further as shown in FIG. 5, the image management module 245 is coupled to the process orchestrator 145. Also, as shown in FIG. 5, the process orchestrator 145 is coupled to the enterprise data server 117 via the data connectors 205, various client device(s) such as the rich client device 120 and the thin client device 125 and other modules including the user management module 225 and the device detection module 220.

In operation, the input module 505 obtains a request for image management from the thin client device 125 and/or the rich client device 120. The device identification module 510 determines a type of client device (from which the request is received) and other device parameters associated with the client device, such as browser type, image compatibility, memory size, resolution based parameters, etc. In one embodiment, the image administrator 515 determines whether the image data requested exists in the image cache memory 525. If the requested image data exist in the image cache memory 525, then the image data retrieval module 520 retrieves the requested image data from the image cache memory 525.

If the requested image data does not exist in the image cache memory 525, then the image administrator 515 requests to fetch the requested image data from the enterprise data server 117 via the process orchestrator 145. In one implementation, the process orchestrator 145 may use different types of the data connectors 205 to fetch the requested image data. The image administrator 515 then stores the fetched image data in the image cache memory 525. Also, the image administrator 515 determines whether the fetched image data is in the required format or not. The image administrator 515 performs this determination for the image data obtained from the enterprise data server 117.

The image administrator 515 then forwards the image data to the image manager 530 to process the image data if the image data needs to be processed. For example, processing of the image data includes formatting, sizing, bit depth correction, etc. As shown in FIG. 5, the image manager 530 includes a format module 535, a sizing module 540 and a bit depth module 545. The format module 535 performs formatting of the image data, which includes conversion from one format to another based on the requirement. The sizing module 540 performs resizing of the image data based on the capability of the client device. Further, the bit depth module 545 corrects bit depth of the image data based on the requirement/capability of the client device.

The image manager 530, upon processing the image data, forwards a location identifier associated with the requested image data to the output module 550 via the image administrator 515. In one embodiment, the image administrator 515 determines whether processing of image data has been performed as per the requirement of the client device. The output module 550 is configured to forward the location identifier associated with the image data to the respective client devices via the process orchestrator 145.

Figure 6:
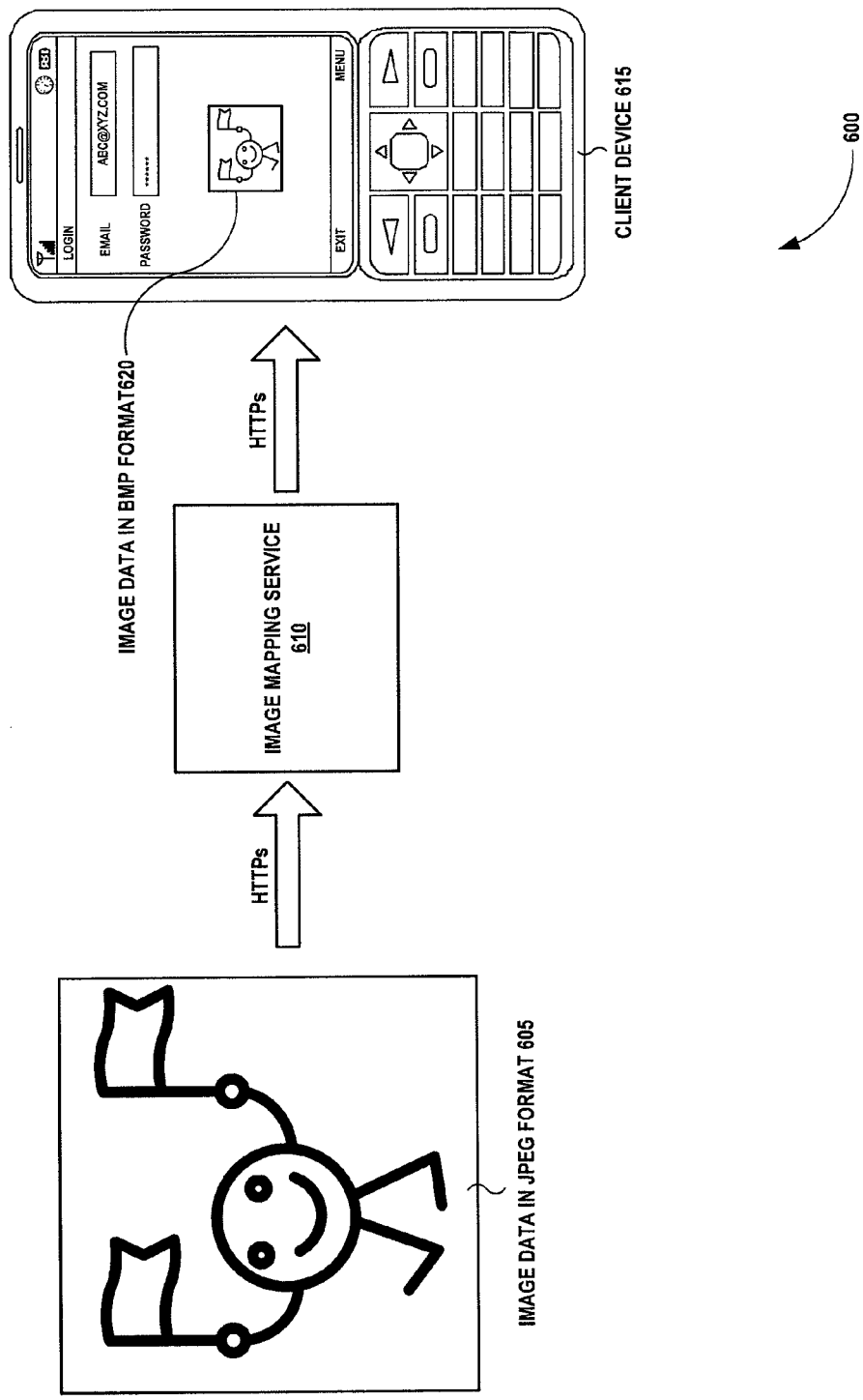
FIG. 6 illustrates a schematic representation of an image mapping service provided to a client device by the various modules described in FIG. 5.

FIG. 6 illustrates a schematic representation 600 of an image mapping service 610 provided to a client device 615 by the various modules described in FIG. 5. As shown in FIG. 6, image data 605 (of specific format, size and a bit depth resolution) fetched from the enterprise data server 117 is transformed into image data 620 based on device specific capabilities of the client device 615. For example, as shown in FIG. 6, the image data 605 in JPEG format is transformed to the image data 620 in BMP format as the client device 615 is not capable of processing the image data 605 in JPEG format.

Also, as shown in FIG. 6, the transformed image data 620 is displayed on the client device 615. It is should be noted that, the image management module 215 of FIG. 5 transforms the image data 605 (e.g., obtained via HTTPs) to a format, size and bit depth resolution required by the client device 615. In this manner, the image management technique enables a user to access image data 620 on any client device having different processing capabilities.

Figure 7:
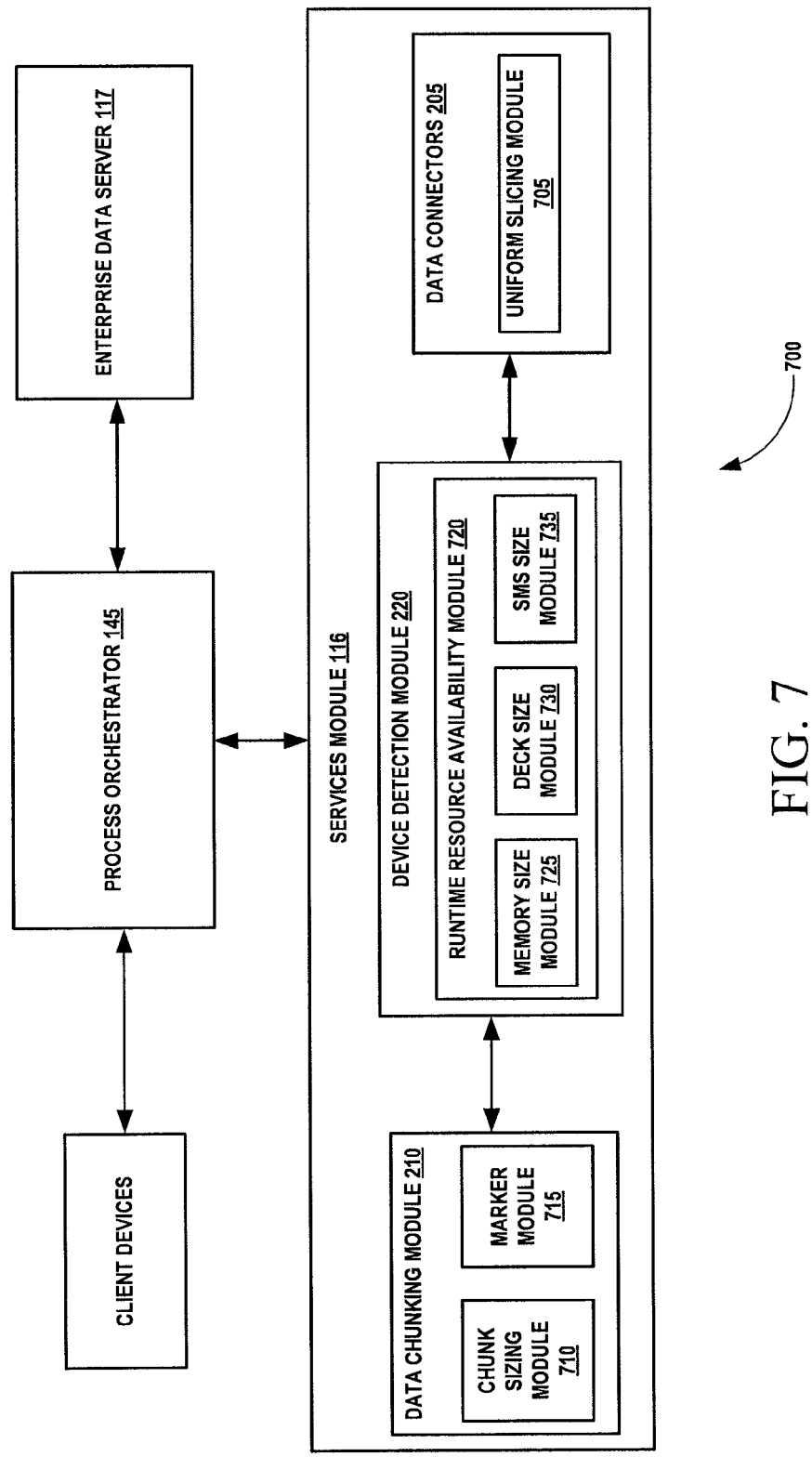
FIG. 7 is a block diagram of the data chunking module of FIG. 2.

FIG. 7 is a block diagram 700 of the data chunking module 210 of FIG. 2. Particularly, FIG. 7 illustrates the process orchestrator 145 coupled to the services module 116 which includes the data connectors 205, the data chunking module 210, the device detection module 220. The process orchestrator 145 also is coupled to the enterprise data server 117 and the client devices (e.g., the rich client device 120, the thin client device 125 and the SMS/MMS client device 130 of FIG. 1). As shown in FIG. 7, the data connectors 205 include a uniform slicing module 705. Further, as shown in FIG. 7, the data chunking module 210 includes a chunk sizing module 710 and a marker module 715. Also, in FIG. 7, the device detection module 220 includes a runtime resource availability module 720 including a memory size module 725, a deck size module 730 and a SMS/MMS size module 735. The memory size module 725, the deck size module 730 and the SMS/MMS size module 735 are associated with determining device runtime resource availability of the rich client application, the thin client application and the SMS/MMS client application, respectively.

In operation, the data connectors 205 fetch data from the enterprise data server 117 based on the request from the client device. In one embodiment, the data is fetched based on the request from the client device. Further, the uniform slicing module 705 splits the data into records of different or similar sizes. The records are then stored in the user management module 225 via the process orchestrator 145. The device detection module 220 identifies a type of client application and also the runtime resource availability of the client device/client application using the runtime resource availability module 720. For example, the memory size module 725 determines current available memory of the rich client application, whereas the deck size module 730 determines a browser deck size of the thin client application.

The data chunking module 210 determines a number of records that forms a data chunk based on the runtime resource availability of the client device using the chunk sizing module 710. Alternatively, the data chunking module 210 may determine a number of records that forms a data chunk based on a predetermined threshold size using the chunk sizing module 710. The data chunking module 210 then compiles one or more records based on the determination and forwards the data chunk(s) to the user management module 225 for storing the data chunks. The marker module 715 places a marker on a first record of the next data chunk. The process orchestrator 145 forwards the data chunk(s) to the client device based on the request from the client device.

Figure 8:
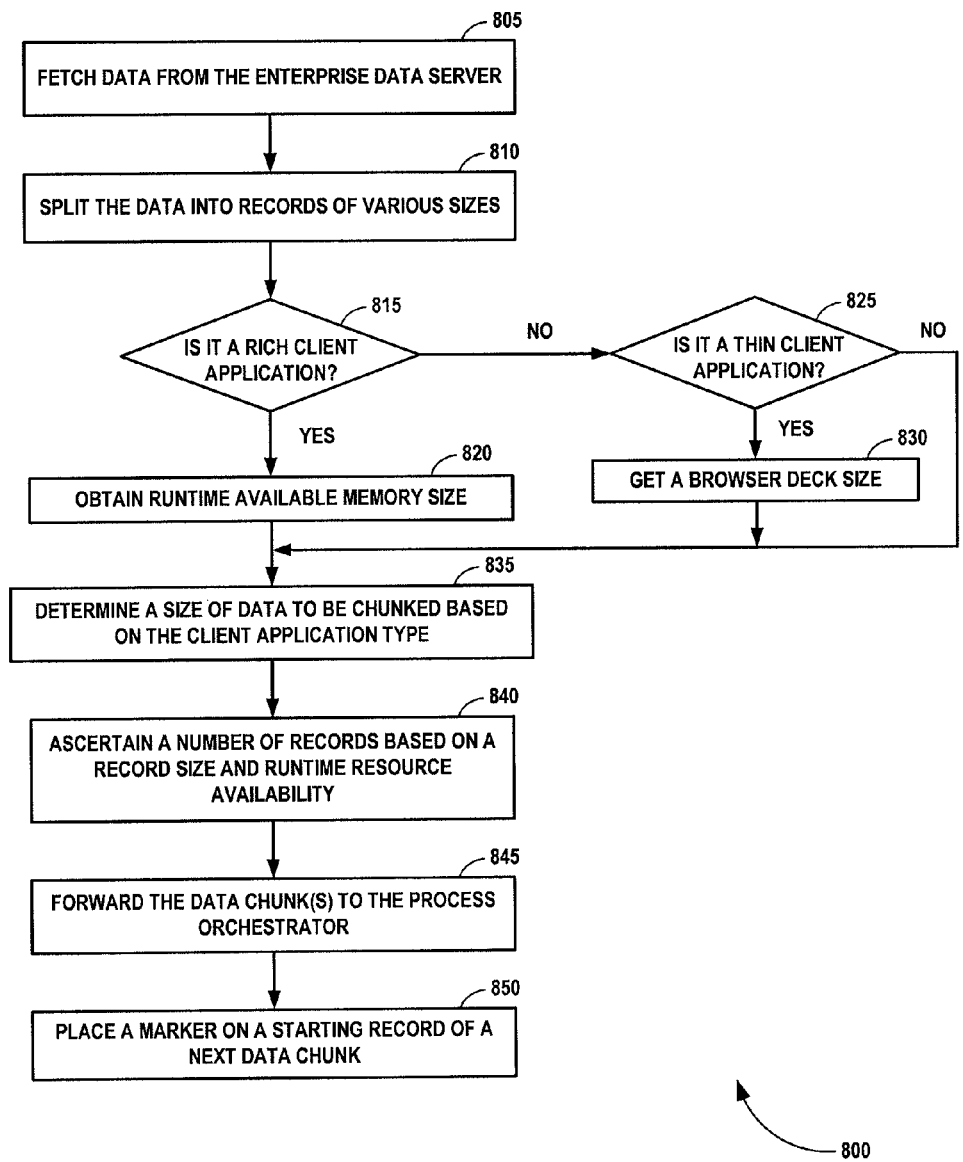
FIG. 8 illustrates a process flowchart of a method of chunking the fetched external data based on device runtime resource availability in the mobile computing platform of FIG. 1.

FIG. 8 illustrates a process flowchart 800 of a method of chunking the fetched external data based on device runtime resource availability in the mobile computing platform 100 of FIG. 1. In step 805, data from the enterprise data server 117 is fetched using a specific type of the data connectors (e.g., EIS connector, web service connector, database connector, etc.). In one embodiment, the data is associated with a request from a client device (e.g., the client devices shown in FIG. 1). In step 810, the data is split into records of various sizes. It is appreciated that the data is split into records based on atomic units or lexical units.

In step 815, a type of a client application (e.g., a thin client application, a rich client application, etc.) is determined. If it the determined type is a rich client application, then the process 800 performs step 820, else the process 800 goes to step 825. In step 820, a runtime available memory size of the rich client device is obtained. In step 825, a determination is made to check whether the type of client application is associated with a thin client application or not. If the determination made in step 825 is true, a browser deck size associated with the thin client application is obtained in step 830. If the determination made in step 825 is false, it is inferred that the type of client application type is a SMS thin client application. The process 800 then performs step 835, upon determining the device runtime resource availability associated with the different types of client devices/client application types.

In step 835, a size of data to be chunked is determined based on the determined client application type/client capability. In step 840, a number of records forming a data chunk are ascertained based on the size of the records and the device runtime resource availability. In step 845, one or more data chunks are forwarded to a process orchestrator (e.g., the process orchestrator 145 of FIG. 1). In one embodiment, the data chunks are stored in a user management module (e.g., the user management module 225 of FIG. 2) and forwarded to the client device based on the request from the client device. In step 850, a marker is placed on a first record of a next data chunk.

Figure 9:
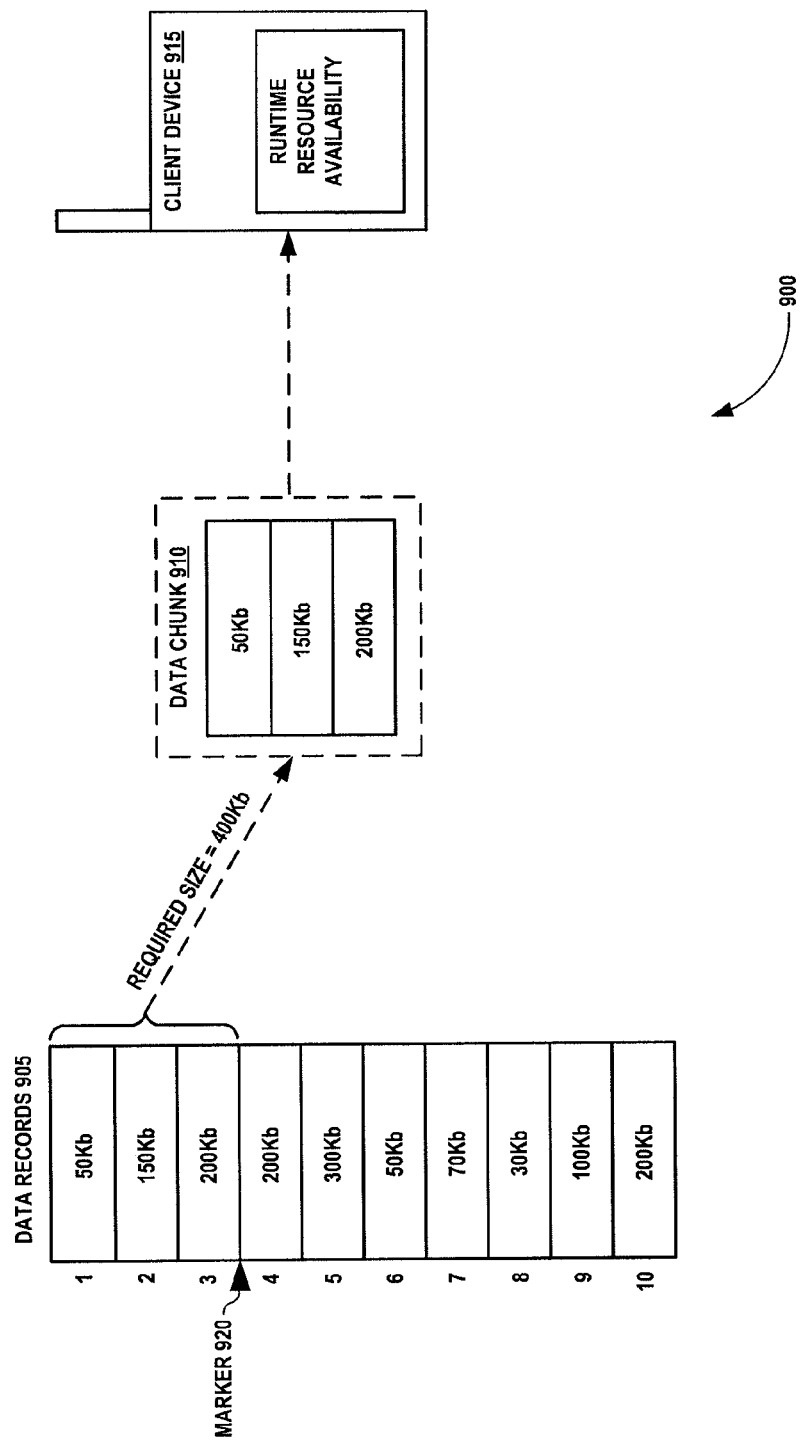
FIG. 9 is a schematic representation of a data chunking process performed by various modules of FIG. 7.

FIG. 9 is a schematic representation 900 of a data chunking process, according to an embodiment of the present disclosure. As shown in FIG. 9, data fetched from the enterprise data server 117 is split into 10 records of various sizes (as illustrated by reference numeral 905). It can be seen from FIG. 9 that, the record 1 is of 50 Kb, the record 2 is of 150 Kb, the records 3 is of 200 Kb, the record 4 is of 200 Kb, the record 5 is of 300 Kb, the record 6 is of 50 Kb, the record 7 is of 30 Kb, the record 8 is of 100 Kb and the record 10 is of 200 Kb. For the purpose of illustration, consider the client device which requested for the data to be a rich client device 915 and a runtime available memory size of the rich client device to be 400 Kb.

In this scenario, the data chunking module 210 of FIG. 2 determines that the rich client device 915 is capable of consuming less than or equal to 400 Kb of data, in other words, the rich client device can take a data chunk of less than or equal to 400 Kb size. Based on the determination, the data chunking module 210 also determines number of records that can form the data chunk not more than 400 Kb size. It can be seen from FIG. 9 that, the record 1 (50 Kb), record 2 (150 Kb) and record 3 (200 Kb) can be compiled to form a first data chunk 910 of 400 Kb size. Thus, the first data chunk 910 constitutes records 1-3. It can also be seen from FIG. 9 that, the next available record is the record 4 which is 200 Kb in size. Thus, the data chunking module 210 places a marker 920 on a first data record to be included on a subsequent data chunk. The first data chunk 910 is then forwarded to the client device. One skilled in the art will appreciate that the data chunking is performed based on the runtime resource availability of the client device.

The technology is operational with numerous other general purpose or special purpose computing system environments or configurations. Examples of well known computing systems, environments, and/or configurations that may be suitable for use with the technology disclosed herein include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

A Local Area Network (LAN), personal area network (PAN), or Wide Area Network (WAN) may be a home or corporate computing network, including access to the Internet, to which computers and computing devices comprising the system are connected. In one embodiment, the LAN conforms to the Transmission Control Protocol/Internet Protocol (TCP/IP) industry standard.

A microprocessor may be any conventional general purpose single- or multi-chip microprocessor such as a Pentium® processor, a Pentium® Pro processor, a 8051 processor, a MIPS® processor, a Power PC® processor, or an Alpha® processor. In addition, the microprocessor may be any conventional special purpose microprocessor such as a digital signal processor or a graphics processor. The microprocessor typically has conventional address lines, conventional data lines, and one or more conventional control lines.

The system is comprised of various modules/components as discussed in detail. As can be appreciated by one of ordinary skill in the art, each of the modules comprises various sub-routines, procedures, definitional statements and macros. Each of the modules are typically separately compiled and linked into a single executable program. Therefore, the description of each of the modules is used for convenience to describe the functionality of the preferred system. Thus, the processes that are undergone by each of the modules may be arbitrarily redistributed to one of the other modules, combined together in a single module, or made available in, for example, a shareable dynamic link library.

The system may be used in connection with various operating systems such as Linux®, UNIX® or Microsoft Windows®.

The system may be written in any conventional programming language such as C, C++, BASIC, Pascal, or Java, and ran under a conventional operating system. C, C++, BASIC, Pascal, Java, and FORTRAN are industry standard programming languages for which many commercial compilers can be used to create executable code. The system may also be written using interpreted languages such as Perl, Python or Ruby.

A web browser comprising a web browser user interface may be used to display information (such as textual and graphical information) to a user. The web browser may comprise any type of visual display capable of displaying information received via a network. Examples of web browsers include Microsoft's Internet Explorer browser, Netscape's Navigator browser, Mozilla's Firefox browser, PalmSource's Web Browser, Apple's Safari, or any other browsing or other application software capable of communicating with a network.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more example embodiments, the functions and methods described may be implemented in hardware, software, or firmware executed on a processor, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While the above description has pointed out novel features of the technology as applied to various embodiments, the skilled person will understand that various omissions, substitutions, and changes in the form and details of the device or process illustrated may be made without departing from the scope of the instant technology. Therefore, the scope of the technology is defined by the appended claims rather than by the foregoing description. All variations coming within the meaning and range of equivalency of the claims are embraced within their scope.

What is claimed is:

1. A method for generating native applications for multiple platforms, the method comprising:
providing an application developer studio that provides functionalities for developing a software application for multiple platforms utilizing a single code base, the application developer studio performing a method of:
storing a first source code having a format corresponding to a first programming language,
compiling, via a universal-executable generation system, the first source code to generate a first application that includes calls to one or more non-platform-specific programming interfaces associated with the first programming language, determining, via the universal-executable generation system, a first virtualization layer to be used in conjunction with the first application, the virtualization layer being configured to map the one or more non-platform-specific programming interfaces associated with the first programming language to one or more platform specific programming interfaces associated with a second programming language, wrapping, via the universal-executable generation system, the first application with the first virtualization layer to generate a second application associated with the second programming language, and generating, via the universal-executable generation system, independent of generating the second application, platform specific source code based on the first source code and associated with the second programming language;

wherein a first non-platform-specific programming interface associated with the first programming language is mapped to multiple platform specific programming interfaces associated with the second programming language.

2. The method of claim 1, further comprising:
determining a second virtualization layer to be used in conjunction with the first application, the virtualization layer being configured to map the one or more non-platform-specific programming interfaces associated with the first programming language to one or more platform specific programming interfaces associated with a third programming language;

wrapping the first application with the second virtualization layer to create a third application associated with the third programming language.

3. The method of claim 1, wherein determining the first virtualization layer comprises determining the first virtualization layer based on at least one of hardware of a device and a platform running on the device, wherein the device is configured to execute the second application.

4. The method of claim 3, wherein the platform comprises at least one of the following: a specific version of a mobile operating system and a specific web browser.

5. The method of claim 1, wherein the one or more platform specific programming interfaces comprises one or more of the following: native application programming interfaces, hypertext markup language, Flash, widgets, Javascript, and cascading style sheets.

6. The method of claim 1, wherein the first programming language comprises one of Lua and Javascript.

7. The method of claim 1, wherein the second programming language is associated with one of the following: iOS, Android, webOS, Windows Phone, Windows Mobile, Blackberry OS, Bada, Meego, Symbian Maemo, and Tizen.

8. The method of claim 1, further comprising:
updating the second application by updating the first application and not the virtualization layer wrapped with the first application in the second application.

9. The method of claim 8, wherein updating the first application comprises downloading a third application and replacing the first application with the third application without changing the virtualization layer.

10. The method of claim 8, wherein the second application further comprises a download manager that performs the updating.

11. An apparatus for generating native applications for multiple platforms, the apparatus comprising:
a memory configured to store a first source code having a format corresponding to a first programming language; and at least one processor coupled to the memory, the processor configured to provide an application developer studio that provides functionalities for developing a software application for multiple platforms utilizing a single code base, the application developer studio performing a method of:

compiling, via a universal-executable generation system, the first source code to generate a first application that includes calls to one or more non-platform-specific programming interfaces associated with the first programming language, determining, via a universal-executable generation system, a first virtualization layer to be used in conjunction with the first application, the virtualization layer being configured to map the one or more non-platform-specific programming interfaces associated with the first programming language to one or more platform specific programming interfaces associated with a second programming language, wrapping, via a universal-executable generation system, the first application with the first virtualization layer to generate a second application associated with the second programming language, and generating, via a universal-executable generation system, independent of the generation of the second application, platform specific source code based on the first source code and associated with the second programming language;

wherein a first non-platform-specific programming interface associated with the first programming language is mapped to multiple platform specific programming interfaces associated with the second programming language.

12. The apparatus of claim 11, wherein the processor is further configured to:
determine a second virtualization layer to be used in conjunction with the first application, the virtualization layer being configured to map the one or more non-platform-specific programming interfaces associated with the first programming language to one or more platform specific programming interfaces associated with a third programming language;

wrap the first application with the second virtualization layer to create a third application associated with the third programming language.

13. The apparatus of claim 11, wherein the processor is further configured to determine the first virtualization layer based on at least one of hardware of a device and a platform running on the device, wherein the device is configured to execute the second application.

14. The apparatus of claim 13, wherein the platform comprises at least one of the following: a specific version of a mobile operating system and a specific web browser.

15. The apparatus of claim 11, wherein the one or more platform specific programming interfaces comprises one or more of the following: native application programming interfaces, hypertext markup language, Flash, widgets, Javascript, and cascading style sheets.

16. The apparatus of claim 11, wherein the first programming language comprises one of Lua and Javascript.

17. The apparatus of claim 11, wherein the second programming language is associated with one of the following:

iOS, Android, webOS, Windows Phone, Windows Mobile, Blackberry OS, Bada, Meego, Symbian Maemo, and Tizen.

18. The apparatus of claim 11, wherein the processor is further configured to:
   update the second application by updating the first application and not the virtualization layer wrapped with the first application in the second application.

19. The apparatus of claim 18, wherein updating the first application comprises downloading a third application and replacing the first application with the third application without changing the virtualization layer.

20. The apparatus of claim 18, wherein the second application further comprises a download manager that performs the updating.

21. A non-transitory computer-readable medium storing instructions that when executed by at least one computer causes the at least one computer to perform a method, the method comprising:
   providing an application developer studio that provides functionalities for developing a software application for multiple platforms utilizing a single code base, the application developer studio performing a method of:
   storing a first source code having a format corresponding to a first programming language,
   compiling, via a universal-executable generation system, the first source code to generate a first application that includes calls to one or more non-platform-specific programming interfaces associated with the first programming language,
   determining, via a universal-executable generation system, a first virtualization layer to be used in conjunction with the first application, the virtualization layer being configured to map the one or more non-platform-specific programming interfaces associated with the first programming language to one or more platform specific programming interfaces associated with a second programming language,
   wrapping, via a universal-executable generation system, the first application with the first virtualization layer to generate a second application associated with the second programming language, and
   generating, via a universal-executable generation system, independent of generating the second application, platform specific source code based on the first source code and associated with the second programming language;
   wherein a first non-platform-specific programming interface associated with the first programming language is mapped to multiple platform specific programming interfaces associated with the second programming language.

22. The method of claim 1, wherein the application development studio further provides a forms tool for developing different types and kinds of forms.

23. The method of claim 1, wherein the application development studio further provides a code assistant for developing business logic.

24. The method of claim 1, wherein the application development studio further provides a service definition tool for defining process flow logic in forms or applications on a server side.

\* \* \* \* \*